US011124243B2

(12) United States Patent
Atkin et al.

(10) Patent No.: US 11,124,243 B2
(45) Date of Patent: Sep. 21, 2021

(54) CROSS-CAR BEAM STRUCTURE WITH PENCIL BRACE FOR COWL ATTACHMENT

(71) Applicant: Magnesium Products of America Inc., Eaton Rapids, MI (US)

(72) Inventors: Sean Atkin, Strathroy (CA); Jeremy Bos, Strathroy (CA)

(73) Assignee: MAGNESIUM PRODUCTS OF AMERICA, INC., Eaton Rapids, MI (US)

( * ) Notice: Subject to any disclaimer, the term of this patent is extended or adjusted under 35 U.S.C. 154(b) by 138 days.

(21) Appl. No.: 16/560,705

(22) Filed: Sep. 4, 2019

(65) Prior Publication Data
US 2020/0070893 A1    Mar. 5, 2020

Related U.S. Application Data

(60) Provisional application No. 62/727,385, filed on Sep. 5, 2018.

(51) Int. Cl.
*B62D 25/08*    (2006.01)
*B62D 21/03*    (2006.01)

(52) U.S. Cl.
CPC .......... *B62D 25/081* (2013.01); *B62D 21/03* (2013.01)

(58) Field of Classification Search
CPC .............................. B62D 25/081; B62D 21/03
See application file for complete search history.

(56) References Cited

U.S. PATENT DOCUMENTS

| 7,686,334 B2 | 3/2010 | Schaupensteiner |
| 9,580,107 B1 | 2/2017 | Ranga |
| 2002/0024236 A1 | 2/2002 | Scheib et al. |
| 2003/0183319 A1 | 10/2003 | Morrison et al. |
| 2008/0315611 A1 | 12/2008 | Durocher |
| 2011/0095570 A1* | 4/2011 | Durocher ............ B62D 25/145 296/193.02 |
| 2014/0103685 A1* | 4/2014 | Mani .................... B62D 25/145 296/193.02 |
| 2019/0031247 A1* | 1/2019 | Baudart ............... B62D 25/145 |

OTHER PUBLICATIONS

International Search Report and Written Opinion dated May 4, 2020 in International Application No. PCT/US2019/049571.

* cited by examiner

*Primary Examiner* — Lori L Lyjak
(74) *Attorney, Agent, or Firm* — Foley & Lardner LLP

(57) ABSTRACT

A cross-car beam structure for a vehicle comprises a cross-car beam and a first pencil brace. The cross-car beam comprises a first attachment point, and the first pencil brace comprises a first end and a second end. The first end of the first pencil brace is configured to removably attach to the cross-car beam at the first attachment point. The second end of the first pencil brace is configured to attach to either a second pencil brace or to another automotive component within the vehicle.

19 Claims, 11 Drawing Sheets

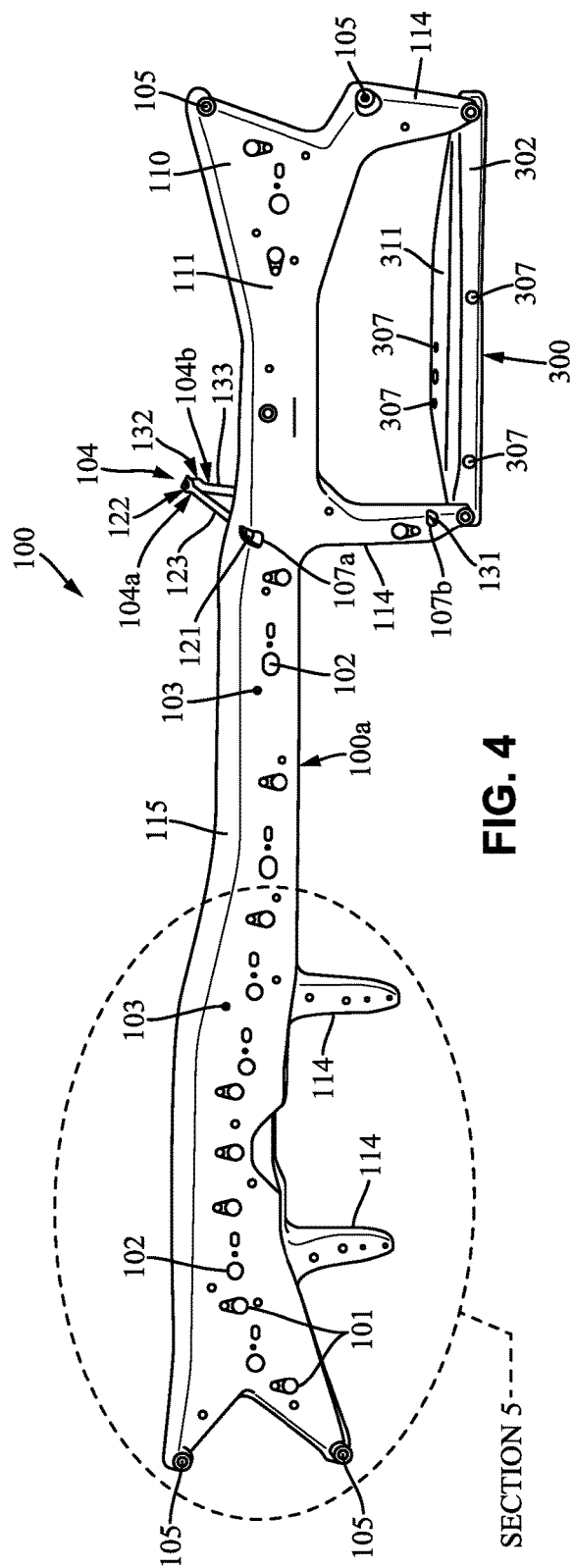
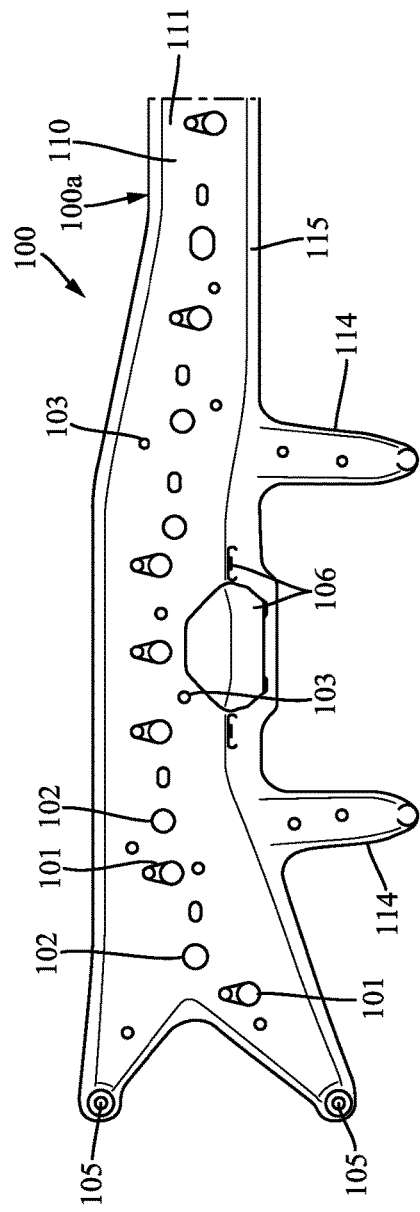
FIG. 4
FIG. 5

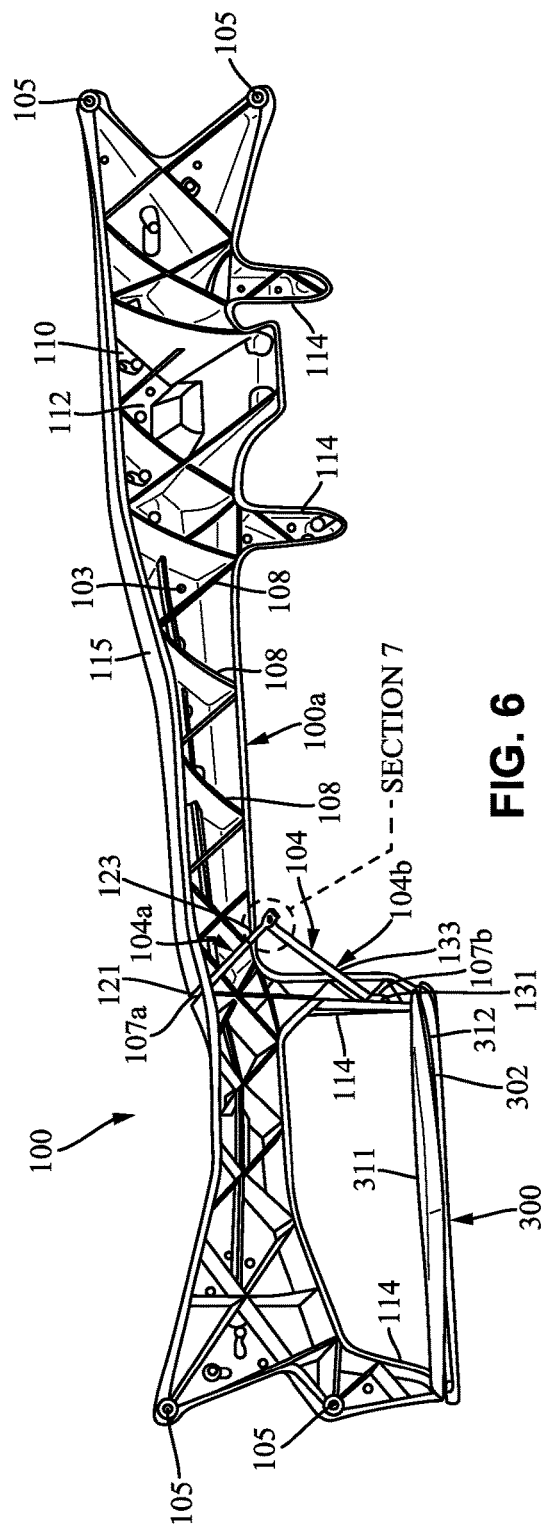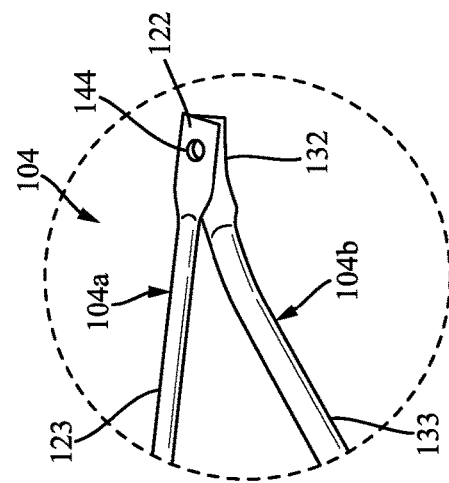

CROSS-CAR BEAM STRUCTURE WITH PENCIL BRACE FOR COWL ATTACHMENT

CROSS-REFERENCE TO RELATED PATENT APPLICATIONS

This application claims priority to and the benefit of U.S. Provisional Patent Application No. 62/727,385, filed Sep. 5, 2018, the entire disclosure of which is incorporated herein by reference.

BACKGROUND

The present application relates to a cross-beam structure for a vehicle. More specifically, the present application relates to a pencil brace for use in lightweight cross-car beam applications.

As shown in FIG. 1, automobiles or automotive vehicles 12 (e.g., cars, trucks, buses, and other automobiles) include a cross-car beam structure 10 attached laterally between opposite sides of the forward portion of the vehicle 12 (FIG. 1 shows the relative placement of the cross-car beam structure 10 in the vehicle 12). Specifically, the cross-car beam structure 10 is generally disposed at the cowl of the vehicle 12 or the junction between an engine compartment and a passenger compartment. The cross-car beam structure 10 serves as a substrate for an instrument panel assembly, which typically includes a steering wheel, airbags, an HVAC unit, and the entire dashboard. Cross-car beam structures 10 also advantageously function to reduce the amount of compression of the passenger compartment in the event of a side impact collision.

Current or conventional cross-car beams (such as the conventional cross-car beam structure 10 shown in FIG. 2) are manufactured completely using steel materials and include a cross-car beam 10a and a cowl attachment component 21. The cowl attachment component 21 supports the rest of the cross-car beam structure 10 and attaches the cross-car beam structure 10 to other components in the interior of the vehicle 12. As further shown in FIG. 2, the cross-car beam structure 10 also includes other features such as glove box brackets 22, a central display unit structure 23, a foot well 24, dual end brackets 25, a steering column bracket 26, and a cowl top brace 27. Each of these components of the cross-car beam structure 10 are steel and are welded to the cross-car beam 10a.

However, the inclusion of the cowl attachment component 21 in the cross-car beam structure 10 results in several drawbacks, including increased material costs and weight of the cross-car beam structure 10. Furthermore, since the various components of the cross-car beam structure 10 in FIG. 2 are welded to the cross-car beam 10a, there is a high degree of variability in relative placement of the various components to each other and the cross-car beam 10a, and therefore a high level of tolerance is needed in order to fit within and attach to a vehicle.

Other conventional cross-car beams (such as the conventional cross-car beam structure 50 shown in FIGS. 15-17) are manufactured completely using magnesium materials. The cross-car beam structure 50 includes a cross-car beam 50a and a cowl attachment component 54, as well as other components (such as an end bracket 55). The entire cross-car beam structure 50 (including the cross-car beam 50a and the cowl attachment component 54) is cast as an integral, one-piece magnesium structure. The cowl attachment component 54 includes a top portion 56 that extends from the top of the cross-car beam 50a and a side portion 59 that extends between a bottom portion of the cross-car beam 50a to an end of the top portion 56. The top portion 56 and the side portion 59 meet at an attachment point 66.

However, due to the inherent requirements of the casting process, a center wall 58 (as shown in FIGS. 15 and 17) is formed between the top portion 56 and the side portion 59. Furthermore, also due to the inherent requirements of the casting process, the side portion 59 (and the center wall 58) substantially increases in thickness between the base 62 and the top 64 (where the top 64 is positioned just beneath the attachment point 66), as shown in FIG. 16. Both of these aspects of the cross-car beam structure 50 increase the weight of the cross-car beam structure 50 without adding to the strength of the cross-car beam structure 50.

Furthermore, the inclusion of the cowl attachment component 21 in the cross-car beam structure 10 and the cowl attachment component 54 in the cross-car beam structure 50 results in several additional drawbacks, such as requiring engineering compromises such as decreased available space for the components and reduced storage or functional space in the passenger compartment. In particular, the cowl attachment components 21 and 54 both increase the amount of space that the cross-car beam structure 10 and 50, respectively, take up, which makes them harder to ship and increases the shipping costs. Furthermore, the cross-car beam structure 10, 50 are limited to certain sized vehicles, rather than being adjustable.

It would be advantageous to provide an improved cross-car beam that overcomes the foregoing challenges. These and other advantageous features will be apparent to those reviewing the present disclosure.

SUMMARY

An exemplary embodiment relates to a cross-car beam structure for a vehicle that includes a cross-car beam and a first pencil brace. The cross-car beam comprises a first attachment point, and the first pencil brace comprises a first end and a second end. The first end of the first pencil brace is configured to removably attach to the cross-car beam at the first attachment point. The second end of the first pencil brace is configured to attach to either a second pencil brace or to another automotive component within the vehicle.

BRIEF DESCRIPTION OF THE DRAWINGS

FIG. 4 is a schematic perspective front view of the cross-car beam structure of FIG. 3.

FIG. 5 is an enlarged view of Section 5 of FIG. 4.

FIG. 6 is a schematic perspective rear view of the cross-car beam structure of FIG. 3.

FIG. 7 is an enlarged view of Section 7 of FIG. 6.

DETAILED DESCRIPTION

The present disclosure describes an improved cross-car beam structure for a vehicle. The improved cross-car beam structure includes a cross-car beam and at least one pencil brace for cowl attachment of the cross-car beam to a component within the vehicle. The cross-car beam (CCB) structure is a component found in the front part of a vehicle (such as the vehicle 12 shown in FIG. 1) under the instrument panel (IP) and is usually designed to support the steering column, airbags, instrument panel, and other systems or components of the vehicle, depending on the complexity of the vehicle. Thus, the CCB structure must have sufficient strength and stiffness to support static and dynamic loads created by the supported systems and components as well as to absorb impact loading which may be transferred from the steering column, knee bolsters and the passenger air bag. The CCB structure must also control vibration of the mounted and associated systems and components to meet criteria limiting noise, vibration, and harshness (NVH) to acceptable levels for passenger satisfaction. In addition to these roles, the CCB structure is also a safety mechanism, as it absorbs impact energy and minimizes steering wheel displacement in case of a collision, reduces overall cockpit vibration, and provides greater strength and control of the steering wheel.

As installed, the cross-car beam structure (in particular the cross-car beam) is secured and extends between vehicle door pillars, which are positioned forwardly of vehicle doors in a vehicle cabin of a vehicle. The cross-car beam structure extends between the door pillars and is shaped to provide rigidity against a lateral impact to the vehicle. Once the cross-car beam structure is assembled within the vehicle, an HVAC unit is mounted directly to the cross-car beam structure followed by other mechanical components, such as the steering column, pedals, brake booster, passenger airbag, and center display unit. The electrical components and wiring harness are added to the cross-car beam structure just before the instrument panel retainer and trim components, which finalize the assembly.

Figure 3:
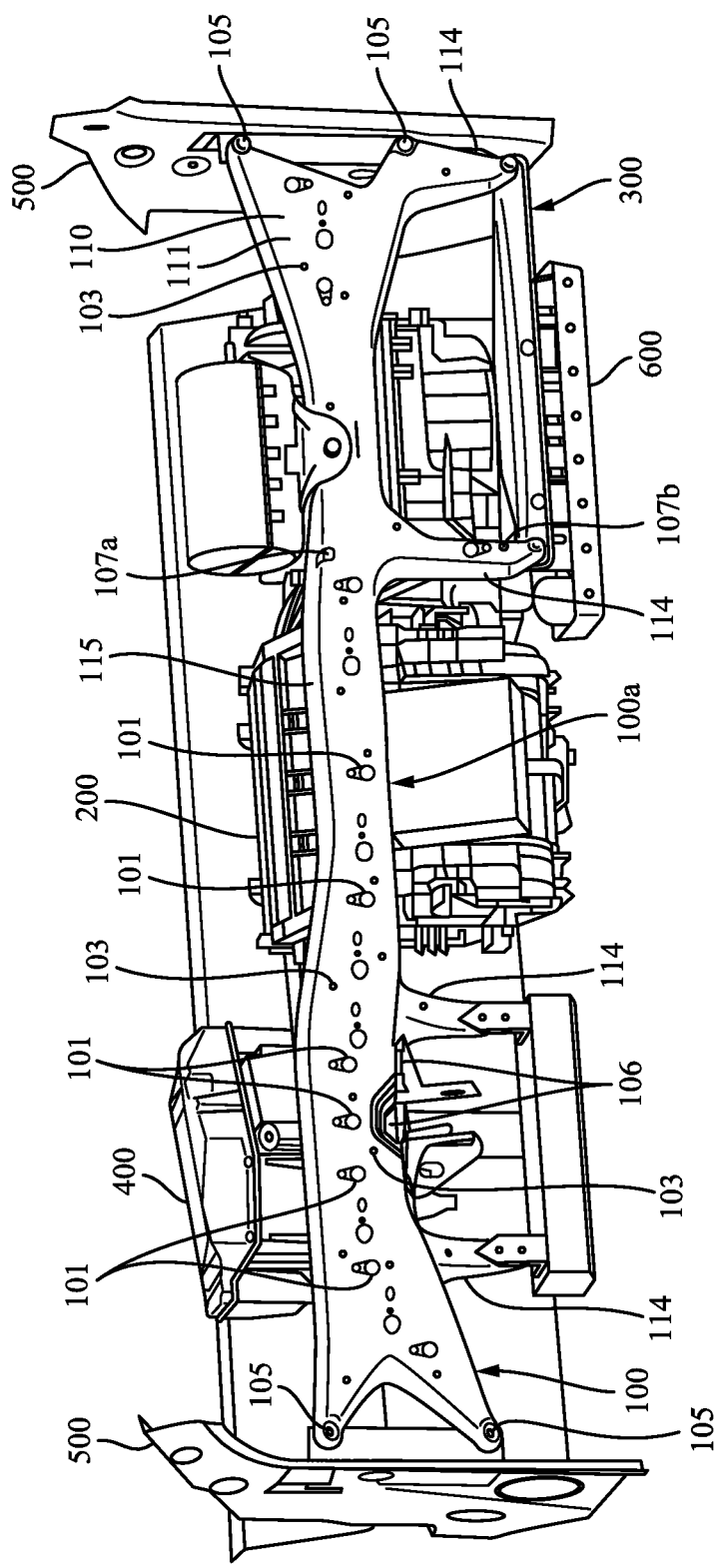
FIG. 3 is a schematic perspective view of one exemplary embodiment of an installed cross-car beam structure.
Figure 9:
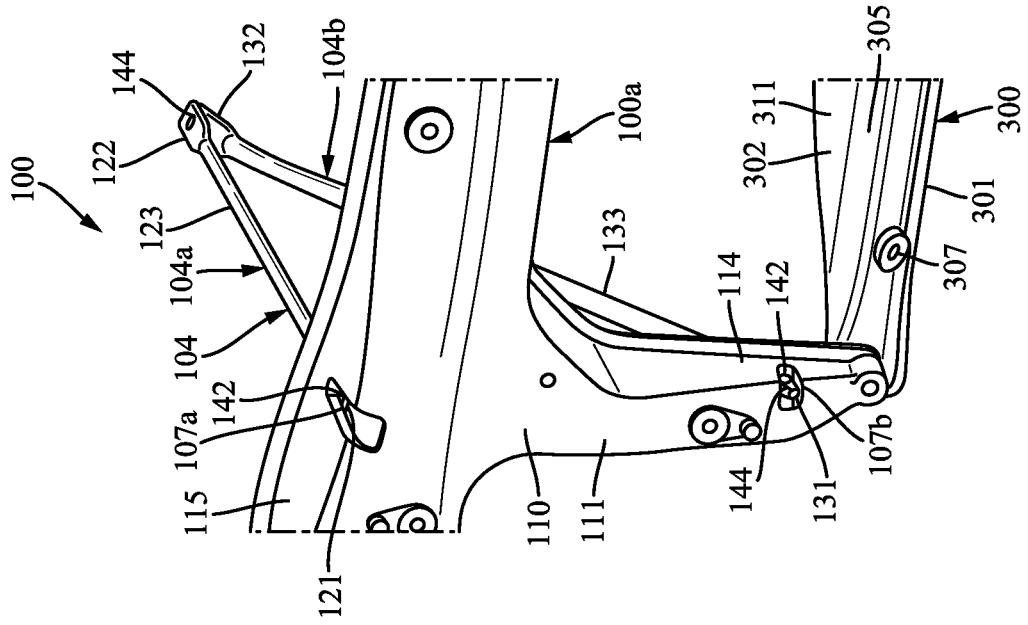
FIG. 9 a schematic perspective front view of a portion of the cross-car beam structure of FIG. 3.
Figure 8:
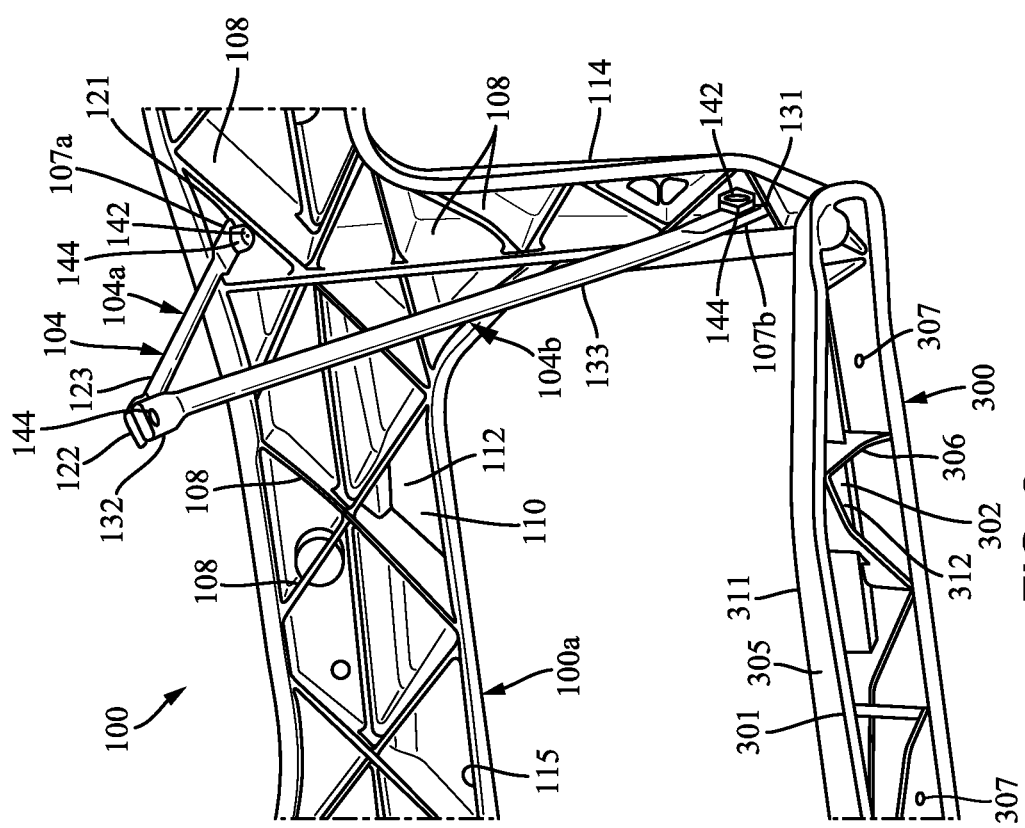
FIG. 8 is a schematic perspective rear view of a portion of the cross-car beam structure of FIG. 3.

Referring to the drawings, FIGS. 3-11 illustrate one exemplary embodiment of a cross-car beam structure 100. FIG. 3 illustrates one exemplary embodiment of the cross-car beam structure 100 in an installed state, FIGS. 4-5 illustrate a front view and an enlarged portion of the front view, respectively, and FIGS. 6-7 illustrate a rear view and an enlarged portion of the rear view, respectively, of the exemplary embodiment of the cross-car beam structure 100 of FIG. 3. FIGS. 8-9 illustrate enlarged portions of the rear and front views, respectively, of the cross-car beam structure of FIG. 3. The cross-car beam structure 100 includes a cross-car beam 100a, a glove box rail 300, and a pencil brace structure 104 (that includes the pencil braces 104a, 104b as shown in FIGS. 4 and 6-7), each of which are described further herein.

As shown in FIG. 3, the cross-car beam 100a extends along the entire length of the cross-car beam structure 100 (which is in the direction of the width of the vehicle). The glove box rail 300 and the pencil braces 104a and 104b each attach to and extend from the cross-car beam 100a. The cross-car beam 100a includes various extensions 114 that extend in the direction of the height of the vehicle and provide areas for other components (such as the glove box rail 300 and/or the steering column 400) to attach to. The cross-car beam 100a includes a main wall 110 that extends along the length of the cross-car beam 100a (i.e., substantially along the width of the vehicle) and a sidewall 115 that extends outwardly and substantially perpendicularly from the main wall 110 about the entire perimeter of the main wall 110. As described further herein, the cross-car beam 100a comprises and defines various attachment points and through-holes (such as instrument panel (IP) attachment points 101, wire harness attachment points 103, attachment through-holes 105 and 106, and first and second attachment points 107a and 107b) that are positioned along and/or extend through the main wall 110 and provide areas for other components (including the glove box rail 300, the pencil braces 104a and 104b, the HVAC unit 200, the steering column 400, the end brackets 500, and the blower 600) to attach to the cross-car beam 100a.

As shown in FIG. 3, the cross-car beam structure 100 is connected (via the cross-car beam 100a) to an HVAC unit 200 and a steering column 400 of the vehicle via the plurality of IP attachment points 101 and the attachment through-holes 106 that are defined by the cross-car beam 100a of the cross-car beam structure 100. The attachment through-holes 106 extend completely through the main wall 110. Wiring for each of the electrical units attached to the cross-car beam structure 100 as well as other electrical units positioned nearby may be routed through the various wire harness attachment points 103 that are defined by the cross-car beam 100a of the cross-car beam structure 100.

Figure 1:
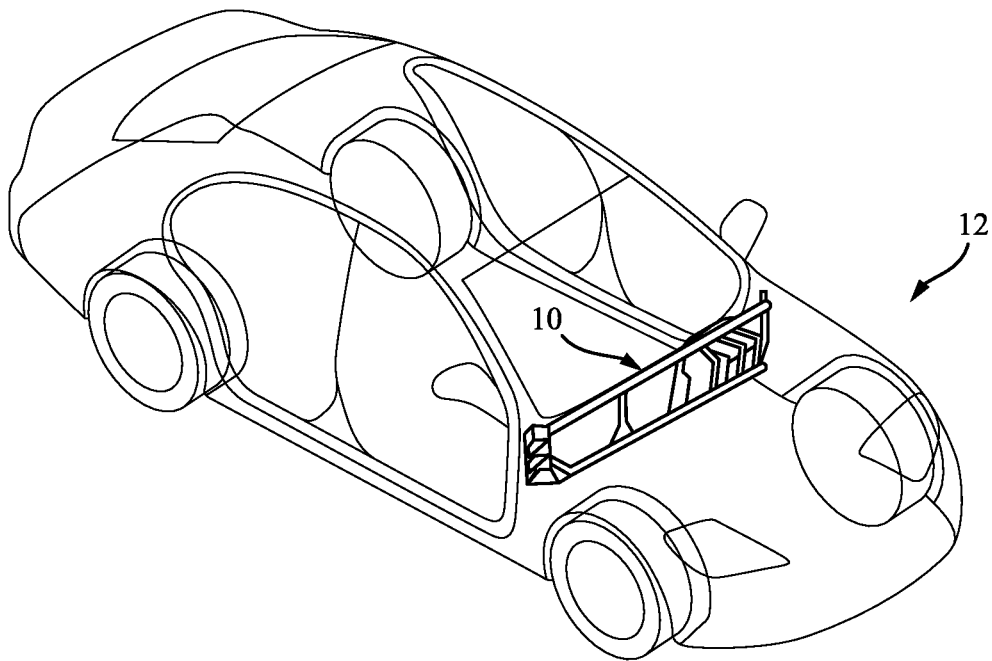
FIG. 1 is a schematic perspective view of a vehicle illustrating the relative placement of a cross-car beam in the vehicle.

The cross-car beam structure 100 is also connected to two end brackets 500 (via opposite ends of the cross-car beam 100a of the cross-car beam structure 100). In particular, the two opposite ends of the cross-car beam 100a (along the length of the cross-car beam 100a) define the attachment through-holes 105 (as shown in FIG. 4) that extend completely through the main wall 110 and are configured to attach to the end brackets 500 (via, for example, a fastener). These two end brackets 500 are each mounted onto opposite vehicle door pillars such that the cross-car beam 100a of the cross-car beam structure 100 extends along the width of the vehicle in the front end of the passenger compartment (in a similar manner as shown in FIG. 1). As shown in FIGS. 4-5, the cross-car beam structure 100 also comprises a plurality of electrical grounding ports 102 to guard against electrical insulation fails or static electricity build-up on a frame of the cross-car beam structure 100.

The main wall 110 of the cross-car beam 100a includes a front or first side 111 (as shown in FIGS. 3-5) and a back or second side 112 (as shown in FIG. 6) that are opposite each other (in the direction of the length of the vehicle). The sidewall 115 extends from the second side 112 of the main wall 110 of the cross-car beam 100a. As shown in FIG. 3, the HVAC unit 200, the steering column 400, and a blower 600 are predominantly positioned along the second side 112 of the main wall 110 (although, according to another embodiment, the HVAC unit 200, the steering column 400, and the blower 600 may be predominantly positioned along the first side 111 of the main wall 110). As shown in FIG. 6, the cross-car beam 100a comprises reinforcing ribs or planks 108 positioned along and extending from the second side 112 of the main wall 110 to provide rigidity and a support structure to the entire cross-car beam 100a. The reinforcing planks 108 extend substantially perpendicularly to the main wall 110, in substantially the same direction as the sidewall 115. The reinforcing planks 108 may extend between inner surfaces of the top and bottom of the sidewall 115.

The cross-car beam 100a may be formed or constructed out of any lightweight, automobile grade, high-strength material such as aluminum (e.g., an aluminum alloy, a reinforced aluminum material, etc.), magnesium (e.g., a magnesium alloy, a reinforced magnesium material, etc.), engineered plastics (e.g., reinforced plastics), or a combination thereof. While conventional cross-car beam structures 10 are made of steel, steel-based cross-car beams are very high weight, for example, between about 14 kg and 22 kg. Other major disadvantages of the conventional cross-car beam structures 10 and 50 have packaging issues, since these structure are too large and consume space otherwise needed for positioning adjacent components. Moreover, conventional steel cross-car beam structures 10 might also be a multi-part modular design comprising multiple components that must be welded, which require great financial and time commitments. Lightweight materials such as aluminum and magnesium are viable alternatives within the cross-car beam 100a to replace the traditional steel cross-car beam structures 10 because of reduced weight and more flexible configuration advantages. For example, magnesium cross-car beams 100a may be optimized to achieve a blend of superior mechanical properties (i.e. stiffness and strength) and design efficiency (i.e. using a thinner material-of-construction of the walls of the cross-car beam 100a). In one embodiment, magnesium thin-wall die castings may be as low as in the range of 1.0 mm to 2.5 mm. In one embodiment, a hybrid construction may be implemented to configure the cross-car-beam 100a having optimized characteristics of several materials. For example, steel or other lightweight metal may be used to provide the cross-car beam 100a with predetermined stiffness and strength properties while plastics (i.e. polypropylene, polycarbonate, or other similar molded plastic) may be used to drastically reduce the overall weight of the cross-car beam 100a. The cross-car beam 100a may be constructed as a single piece (that is attachable to the pencil brace structure 104, as described further herein). Accordingly, the cross-car beam 100a comprises a single unitary component that cannot be separated without destruction and may be constructed as a single plastic molded part.

The glove box rail 300 of the cross-car beam structure 100 is a separately constructed feature from the cross-car beam 100a and is configured to mount a glove box within the vehicle. In particular, the glove box rail 300 functions as a substrate upon which the glove box, positioned in a front passenger portion of the passenger compartment, is mounted. Moreover, the glove box rail 300 also is configured to secure the passenger side knee airbag. As shown in FIGS. 3-4 and 6, the glove box rail 300 is attached to and extends between two extensions 114 of the cross-car beam 100a via, for example, fasteners. The glove box rail 300 may extend between the two extension 114 in the direction of the length of the cross-car beam 100a (i.e., along the width of the vehicle). The glove box rail 300 is removable from and reattachable to the cross-car beam 100a.

Figure 10:
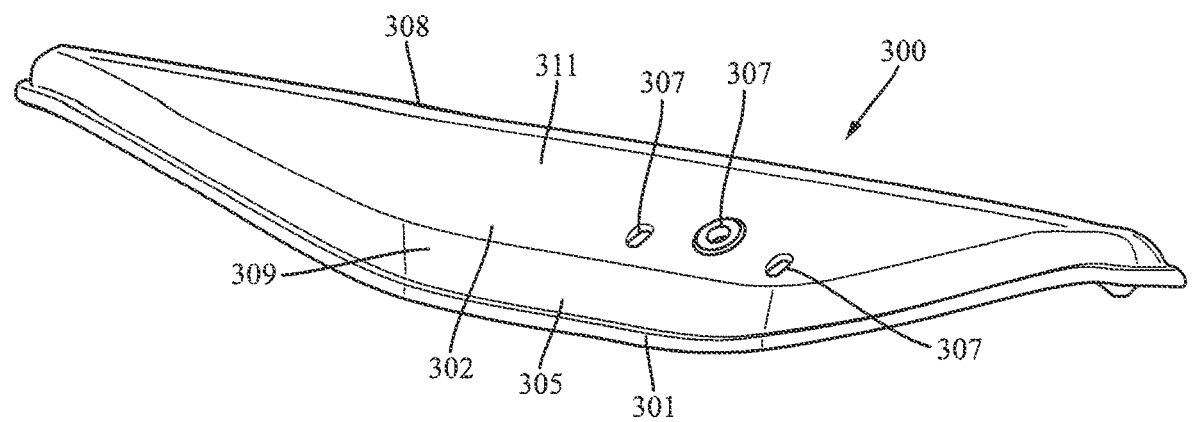
FIG. 10 is a schematic perspective top view of the glove box rail shown in FIG. 3.
Figure 11:
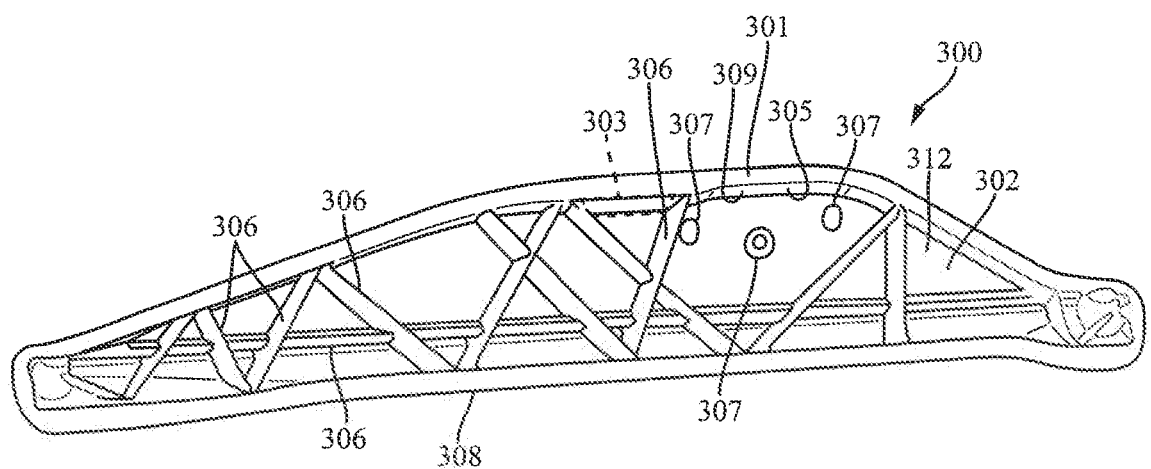
FIG. 11 is a schematic perspective bottom view of the glove box rail shown in FIG. 3.

FIGS. 10-11 illustrate enlarged front and rear views, respectively, of the glove box rail 300. As shown in FIG. 10, the glove box rail 300 comprises a circumferential lip or flange 301 having a thickness in the range of 4 mm to 6 mm (for example, 5 mm) that forms an outer boundary of the glove box rail 300 and extends outwardly and substantially perpendicularly from a sidewall 305 of the glove box rail 300. The circumferential flange 301 extends about the entire perimeter of the sidewall 305 (and thus the main wall 302). The circumferential flange 301 is connected to a main wall 302 having a thickness in the range of 1 mm to 6 mm (for example, 2.3 mm) via the sidewall 305. The sidewall 305 extends outwardly and substantially perpendicularly from the main wall 302 about the entire perimeter of the main wall 302. The main wall 302 extends along the length of the cross-car beam 100a (i.e., substantially along the width of the vehicle).

The main wall 302 of the glove box rail 300 includes a top or first side 311 (as shown in FIG. 10) and a bottom or second side 312 (as shown in FIG. 11) that are opposite each other, as shown in FIG. 8. The sidewall 305 extends from the second side 312 of the main wall 302. As shown in FIG. 11, the glove box rail 300 comprises reinforcing ribs or planks 306 along the second side 312 of the main wall 302 to provide rigidity and a support structure to the glove box rail 300. The reinforcing planks 306 extend substantially perpendicularly to the main wall 302, in substantially the same direction as the sidewall 305. The reinforcing planks 306 may extend between inner surfaces of the first portion 308 and the second portion 309 (as described further herein) of the sidewall 305.

The glove box rail 300 defines through-holes 307 that extend completely through the main wall 302 and enable connection of a blower 600 (as shown in FIG. 3) and/or other vehicle components to the glove box rail 300. Once attached with the blower 600, the blower 600 extends between and along a first portion 308 of the sidewall 305 and a second portion 309 of the sidewall 305. As shown in FIGS. 10-11, the first portion 308 and the second portion 309 of the sidewall 305 are on opposite sides of the main wall 302. As shown in FIG. 11, the second portion 309 comprises a section 303 which contacts the blower 600 and disperses the weight distribution of the load of the blower 600.

Figure 2:
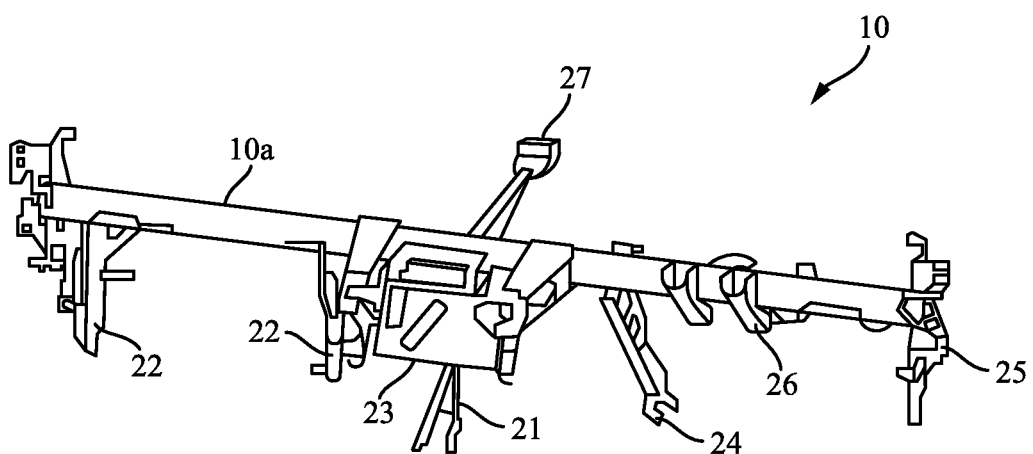
FIG. 2 is schematic perspective view of a conventional cross-car beam structure comprising a cowl attachment component.
Figure 15:
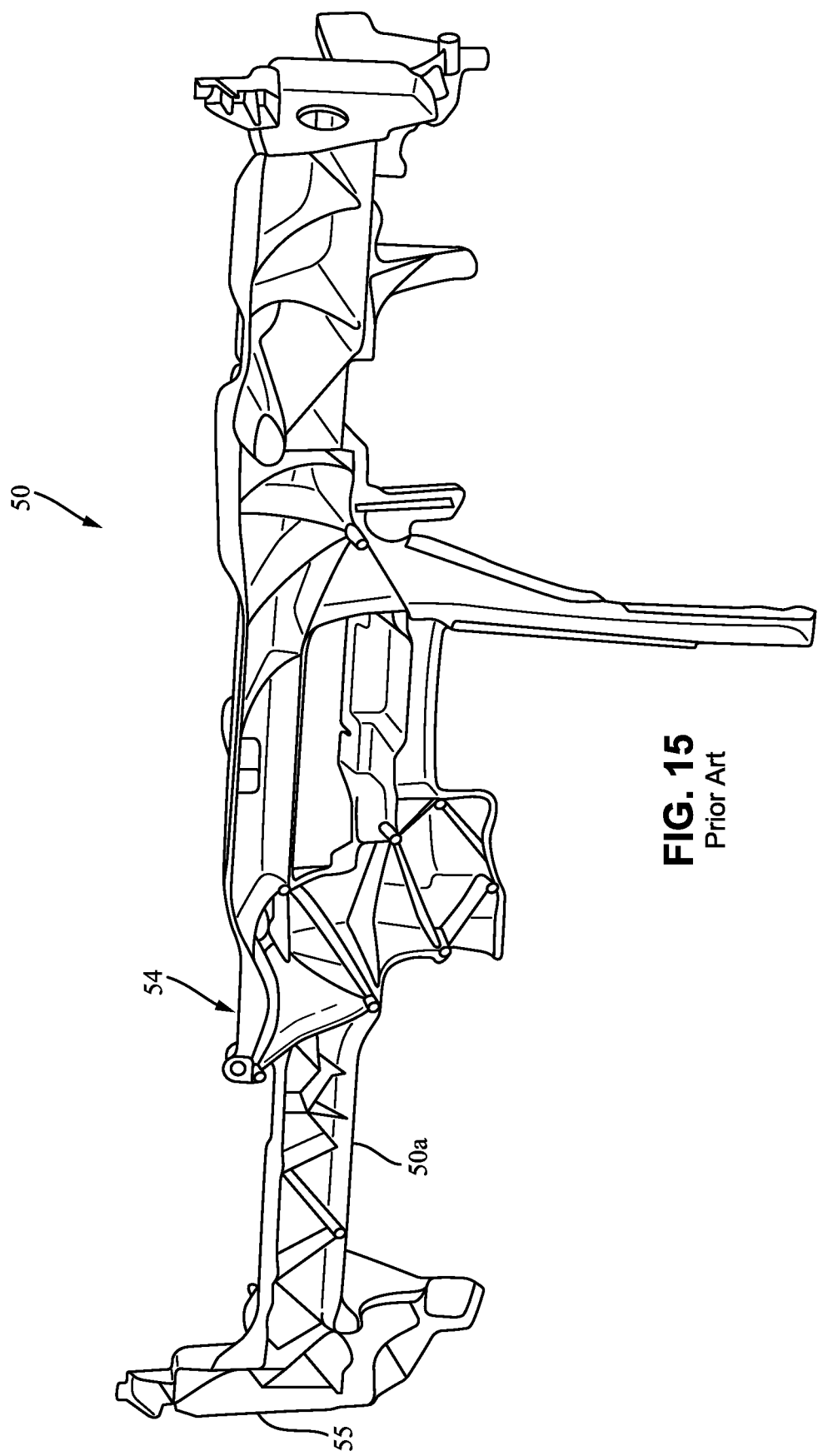
FIG. 15 is schematic perspective view of another conventional cross-car beam structure comprising a cowl attachment component.
Figure 16:
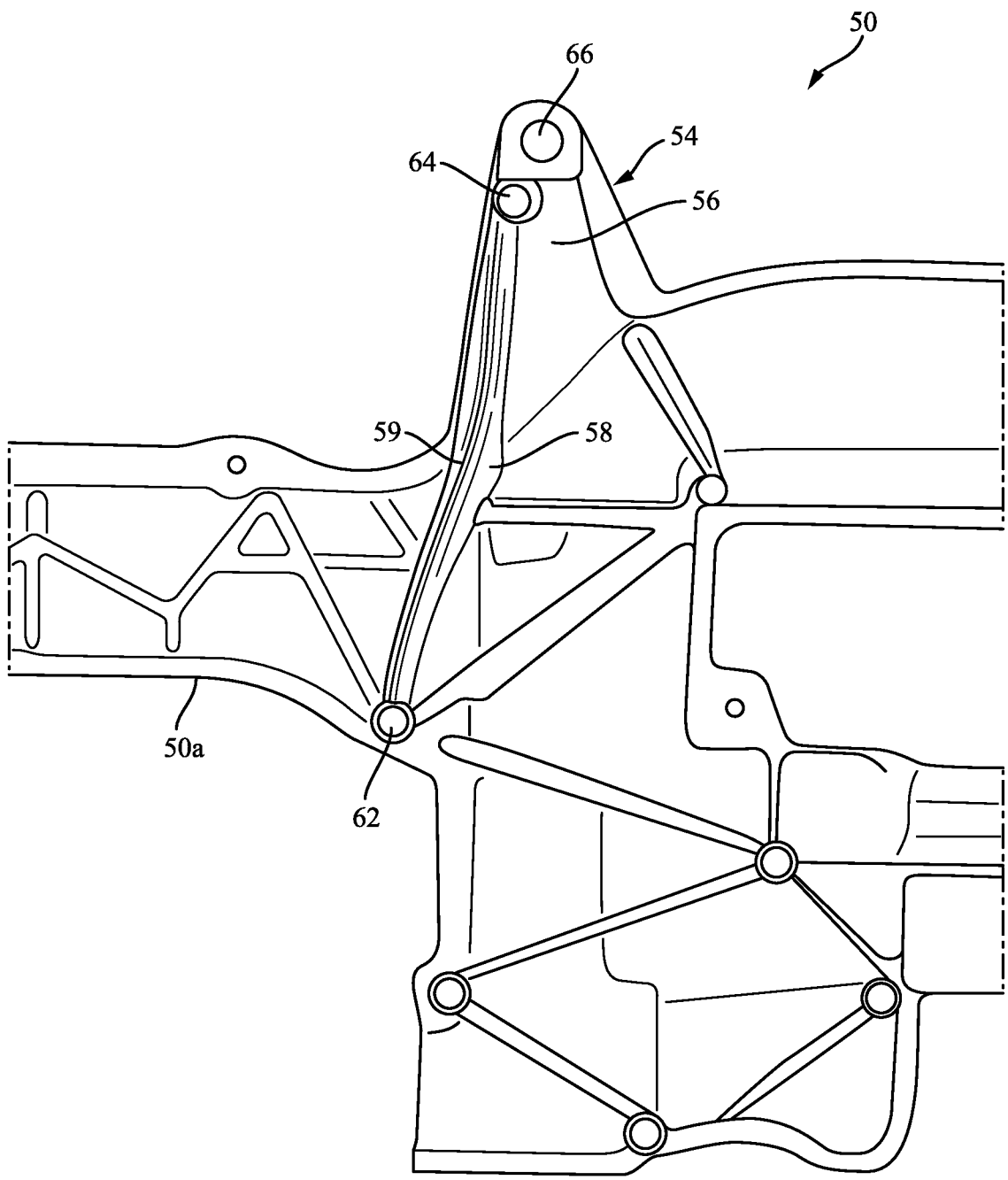
FIG. 16 is a plan view of a portion of the cross-car beam structure of FIG. 15.
Figure 17:
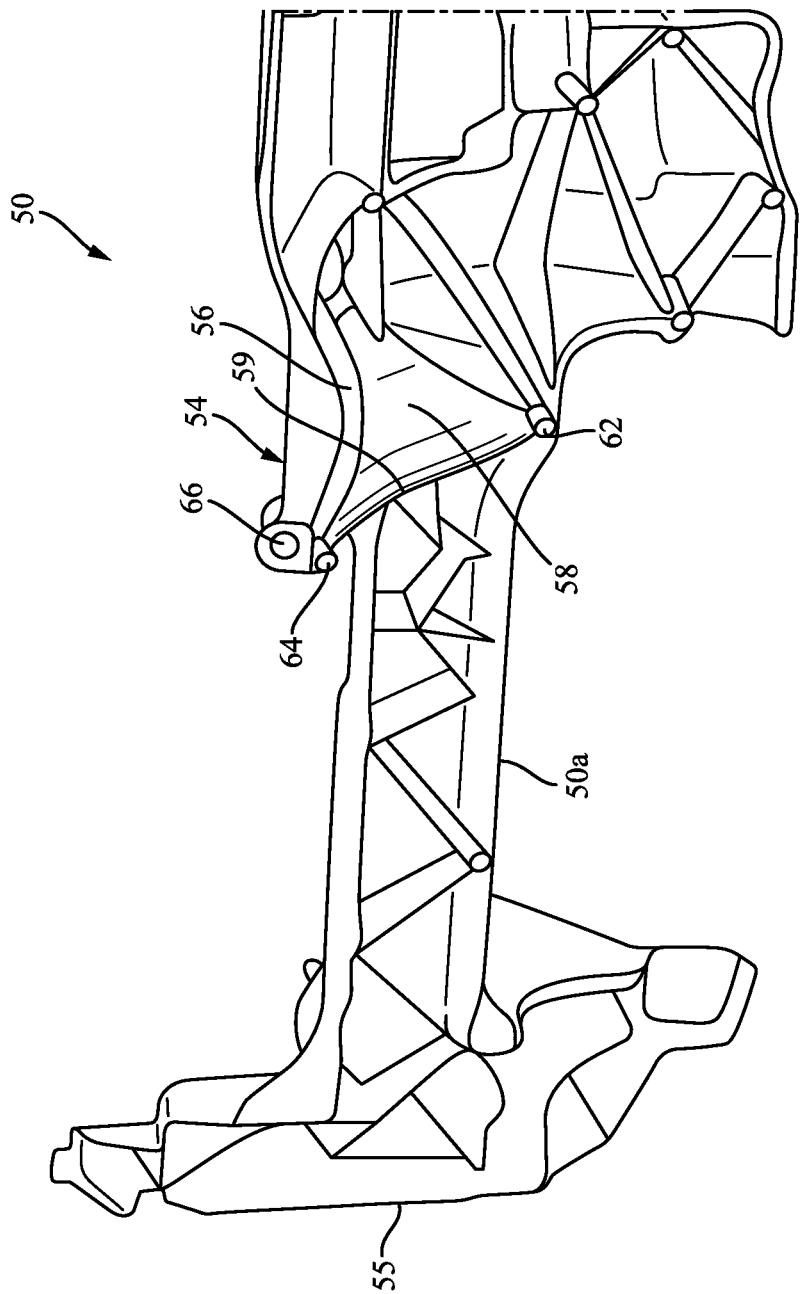
FIG. 17 is a perspective view of a portion of the cross-car beam structure of FIG. 15.

Unlike conventional cross-car beam structures 10 and 50 (as shown in FIGS. 2 and 15-17), the embodiment of the cross-car beam structure 100 of FIGS. 3-11 does not contain a cowl attachment component (such as the cowl attachment component 21, as shown in FIG. 2 or the cowl attachment component 54, as shown in FIGS. 15-17). Instead of a cowl attachment component, the cross-car beam structure 100 includes a pencil brace structure 104 that supports the cross-car beam 100a and attaches the cross-car beam 100a to other components within the vehicle. The pencil brace structure 104 (in particular the pencil braces 104a and 104b) distributes the weight or load of the HVAC unit 200 (as shown in FIG. 3) and supports the cross-car beam 100a in a similar manner as the cowl attachment component, but without the increased material costs, with increased strength, and with a lower overall weight of the cross-car beam structure 100. The pencil brace structure 104 may be positioned along the passenger-side (rather than the driver-side) of the cross-car beam 100a of the cross-car beam structure 100. For example, as shown in FIGS. 4 and 6, the pencil brace structure 104 may be positioned above at least a portion of the glove box rail 300. The pencil brace structure 104 is removable from and reattachable to the cross-car beam 100a.

Compared to the conventional cowl attachment component 21 in FIG. 2, the pencil brace structure 104 allows the cross-car beam 100*a* to be constructed out of a lighter weight material, such as magnesium. Additionally, the cross-car beam 100*a* can be cast as a single part that includes and integrates certain components (other than the pencil beam structure 104), such as various attachment holes and/or various other components (e.g., the end brackets), rather than many different components being welded onto the cross-car beam 10*a* as shown in FIG. 2. By including these various components and holes with the cross-car beam 100*a*, potential variation in relative placement of these components and holes is decreased, and the cross-car beam 100*a* is more accurately and consistently constructed for alignment and attachment with other components within the vehicle. Furthermore, the pencil brace structure 104 is fastened or bolted to the cross-car beam 100*a* (instead of welding), which allows the pencil brace structure 104 to align with and attach to a wider range of sizes of other components and decreases the overall size of the cross-car beam 100*a* for shipping.

Compared to the conventional cowl attachment component 54 in FIGS. 15-17, the pencil brace structure 104 is created as a separate part from the cross-car beam 100*a* (and later attached), which allows the cross-car beam 100*a* to be cast as a less complex shape. Therefore, the cross-car beam 100*a* may be cast more simply and smaller (thereby lowering the shipping costs), and with a smaller die cast machine. Furthermore, the cross-car beam structure 100 can be made faster by casting multiple (instead of one) cross-car beams 100*a* within a dual cavity (rather than a single cavity). Additionally, the pencil brace structure 104 can be constructed out of a different material (such as steel) than the cross-car beam 100*a* in order to increase the strength of the pencil brace structure 104. Even further, by attaching the pencil brace structure 104 to the cross-car beam 104*a* later, the cross-car beam structure 100 is smaller and therefore can be shipped easier and more inexpensively. This also allows the cross-car beam structure 100 to fit with differently sized vehicles. Additional benefits over the conventional cowl attachment components 21, 54 are described further herein.

As shown in FIGS. 4 and 6-9, the pencil brace structure 104 includes two pencil braces (i.e., the first pencil brace 104*a* and the second pencil brace 104*b*). The first pencil brace 104*a* and the second pencil brace 104*b* are connected to the cross-car beam 100*a* via the first attachment point 107*a* and the second attachment point 107*b*, respectively, of the cross-car beam 100*a*. As shown in FIGS. 8-9, the first pencil brace 104*a* comprises a first end 121, a second end 122, and a body portion 123 that extends between the first end 121 and the second end 122. The first end 121 of the pencil brace 104*a* is configured to removably attach directly to the cross-car beam 100*a* at the first attachment point 107*a* with a fastener 142. The second pencil brace 104*b* comprises a first end 131, a second end 132, and a body portion 133 that extends between the first end 131 and the second end 132. The first end 131 of the pencil brace 104*b* is configured to removably attach directly to the cross-car beam 100*a* at the second attachment point 107*b* with a fastener 142. As shown in FIGS. 7-9, the second ends 122, 132 of both of the pencil braces 104*a*, 104*b* are configured to removably attach the pencil braces 104*a*, 104*b* directly to each other (and/or optionally to another automotive component within the vehicle, e.g., the passenger side upper cowl attachment) with another fastener. For example, the second end 122 is configured to attach to the second end 132 (and vice versa). The pencil braces 104*a*, 104*b* are configured to extend from the second side 112 of the main wall 110 of the cross-car beam 100*a* such that the second ends 122, 132 of the pencil braces 104*a*, 104*b* are positioned along the second side 112 of the main wall 110.

The attachment points 107*a*, 107*b* of the cross-car beam 100*a* may be positioned anywhere along the length of the cross-car beam 100*a*. According to one embodiment as shown in FIG. 4, the first attachment point 107*a* is positioned directly above the second attachment point 107*b*. As shown in FIGS. 8-9, the attachment points 107*a*, 107*b* may optionally be through-holes that are configured to receive a fastener 142 (that also extends through a first end 121, 131 of one of the pencil braces 104*a*, 104*b*). According to one embodiment, the attachment points 107*a*, 107*b* are cast with the cross-car beam 100*a* (rather than being machined, drilled, or tapped into the cross-car beam 100*a*), which decreases the amount of labor (and therefore cost) of the cross-car beam structure 100. Due to the positioning and orientation of the attachment points 107*a*, 107*b*, the fastener 142 extends substantially perpendicular to the length of the pencil braces 104*a*, 104*b*, and therefore also perpendicular to the forces applied by each of the pencil braces 104*a*, 104*b*, as shown in FIG. 8. This arrangement causes the forced applied to the fastener 142 to be a shear force, thereby increasing the strength of the connection between the pencil braces 104*a*, 104*b* and the cross-car beam 100*a*. Furthermore, the fasteners 142 can easily be inserted into the attachment points 107*a*, 107*b* and attached to the pencil braces 104*a*, 104*b*.

As shown in FIG. 9, the attachment points 107*a*, 107*b* extend along the fore/aft direction of the vehicle (i.e., in a direction substantially perpendicular to the main wall 110 of the cross-car beam 100*a*, where the main wall 110 extends along the width of the vehicle), which provides built-in variation and allows the cross-car beam structure 100 to fit within a wider range of differently sized vehicles. In particular, this configuration of the attachment points 107*a*, 107*b* allows each of the pencil braces 104*a*, 104*b* to be attachable to the cross-car beam 100*a* in a range of different positions along the length of the attachment points 107*a*, 107*b*.

The second attachment point 107*b* is positioned along one of the extensions 114 (in particular an extension 114 that also attaches to the glove box rail 300). Accordingly, once assembled, the first pencil brace 104*a* is positioned (and attached to the cross-car beam 100*a*) above the second pencil brace 104*b* (and both pencil braces 104*a*, 104*b* are positioned above the glove box rail 300), as shown in FIG. 8. As shown in FIGS. 8-9, the pencil braces 104*a*, 104*b* are angled toward each other in order to attach the second ends 122, 132 together. Accordingly, the pencil braces 104*a*, 104*b* attach to each other such that a triangle shape is formed from the first pencil brace 104*a*, the second pencil brace 104*b*, and a portion of the main wall 110. The area formed between the first pencil brace 104*a*, the second pencil brace 104*b*, and the portion of the main wall 110 is open (i.e., defines an aperture therebetween). This configuration minimizes the weight of the cross-car beam structure 100, in particular compared to the conventional cross-car beam structure 50 that includes the center wall 58 (rather than a hole) due to the casting process. The shape and structure of the pencil brace structure 104 (such as the triangular shape and how the pencil braces 104*a*, 104*b* extend straight, as described further herein) allows the pencil brace structure 104 to be in pure tension.

All of the first ends 121, 131 and the second ends 122, 132 of both of the pencil braces 104*a* and 104*b* has a flat configuration (e.g., may be flattened or crimped) (relative to the body portion 123, 133). According to one exemplary embodiment, the ends may be flattened or crimped after the pencil braces 104*a* and 104*b* are formed; according to other exemplary embodiments, the pencil braces 104*a* and 104*b* may be formed initially with the flattened ends (e.g., in a molding or other suitable process). Each of the ends 121, 122, 131, 132 defines a through-hole or aperture 144 (as shown in FIGS. 7-9, for example) that may be formed by drilling through each of the ends 121, 122, 131, 132 (or, according to other exemplary embodiments, the holes or apertures 144 may be molded or otherwise formed in the ends when the pencil braces 104*a* and 104*b* are formed). Each of the apertures 144 of the ends 121, 122, 131, 132 are configured to receive a fastener (such as the fastener 142) to attach to either the cross-car beam 100*a* (at the first attachment point 107*a* or the second attachment point 107*b*) or to the other pencil brace (and/or other automotive component within the vehicle). Once assembled, the fastener 142 extends through the aperture 144 of the first end 121 of the first pencil brace 104*a* and the attachment point 107*a* of the cross-car beam 100*a* to attach the first pencil brace 104*a* to the cross-car beam 100*a*. Another fastener 142 extends through the aperture 144 of the first end 131 of the second pencil brace 104*b* and the attachment point 107*a* of the cross-car beam 100*a* to attach the second pencil brace 104*b* the cross-car beam 100*a*. Yet another fastener (which may be similar to the fastener 142) extends through the aperture 144 of the second end 122 of the first pencil brace 104*a* and the aperture 144 of the second end 132 of the second pencil brace 104*b* to attach the pencil braces 104*a*, 104*b* to each other and optionally also to another component within the vehicle, such as the instrument panel.

In one embodiment, the cross-car beam structure 100 includes the fastener 142 that is received within each of the through-holes of each of the ends 121, 122, 131, 132 of the pencil braces 104*a*, 104*b*. This fastener 142 may include a nut (such as a weld nut) and a bolt. In other embodiments, the pencil braces 104*a*, 104*b* may be stamped or cast as part of the instrument panel. Metal stamping is a process using dies to transform flat metal sheets into a desired configuration while in a casting process, a liquid material is poured into a mold comprising a hollow cavity of a desired shape, and then allowed to solidify.

Like the cross-car beam 100*a*, the pencil braces 104*a* and 104*b* may be independently formed (from the rest of the cross-car beam structure 100) from any lightweight, automobile grade, high-strength materials such as aluminum, magnesium, engineered plastics, or a combination thereof. In another embodiment, at least one of the pencil braces 104*a* and 104*b* may be formed from a steel material. The pencil braces 104*a* and 104*b* are separately formed from the cross-car beam 100*a* and may optionally be constructed out of a material that is different than the cross-car beam 100*a* in order to reduce the overall weight of the cross-car beam structure 100 (compared to conventional cross-car beam structures 10 and 50), while still providing enough support and strength to pass certain load cases and criteria (for example, to limit NVH, to provide the right type of support in the event of a vehicle accident, and to meet criteria regarding HVAC intrusions).

The pencil braces 104*a* and 104*b* may have any shape suitable for a particular vehicle and application. For example, the body of each of the pencil braces 104*a* and 104*b* may have a cross-section that is circular or may instead have other cross-sectional shapes (e.g., ellipse, square, rectangle, diamond, star, etc.). In one particular embodiment, the pencil braces 104*a* and 104*b* have a cylindrical shape having a substantially circular cross-section. For example, according to one embodiment, substantially the entire length of the pencil braces 104*a*, 104*b* have a substantially circular cross-section. According to another exemplary embodiment, only the body portions 123, 133 have a substantially circular cross-section, while the ends 121, 122, 131, 132 have a substantially flat cross-section (e.g., either as-formed or after crimping/flattening) (as shown in FIGS. 8-9).

Since the pencil brace structure 104 is later attached to the cross-car beam 100*a* (compared to the conventional cowl attachment component 54 that is cast with the cross-car beam 50*a*), the pencil braces 104*a*, 104*b* extend in a substantially straight line (with no bends) between the respective first and second ends, providing a direct, stiffer, and stronger connection between the attachment points at opposite ends of the pencil braces 104*a*, 104*b*, in particular under tension. Accordingly, the body portions 123, 133 are substantially straight with no bends. The straight shape of the pencil braces 104*a*, 104*b* provide a greater strength in order to prevent the HVAC unit 200 from moving (or minimize the amount of movement) in the event of a vehicle accident (e.g., to prevent HVAC intrusion under a front crash load case) and securely holes the cross-car beam 100*a* to the front of dash (i.e., the body structure between the dashboard and the engine back). Due to the configuration of the pencil braces 104*a*, 104*b*, the pencil braces 104*a*, 104*b* can be used with a tolerance adjuster (that accommodates small variances when attach the cross-car beam structure 100 to other components within the vehicle, such as the instrument panel) and still provide a strong, rigid attachment. Comparatively, as shown in FIGS. 16-17, the side portion 59 of the cowl attachment component 54 curves between the base 62 and the top 64 in order to be moved around certain vehicle components during assembly into the vehicle, which decreases the stiffness and strength of the cowl attachment component 54 (compared to the pencil brace structure 104.

The pencil braces 104*a* and 104*b* may also be engineered as having a critical dimension in the range of 0.10 inch to 0.5 inch, with the critical dimension being the longest measured distance across the cross-sectional shape of the pencil braces 104*a* and 104*b*. For example, if the pencil brace 104*a*, 104*b* has a circular cross-sectional shape, this critical dimension is the diameter. The pencil brace 104*a* has a critical dimension in the range of 0.1 inch to 0.3 inch, and the pencil brace 104*b* has a critical dimension in the range of 0.1 inch to 0.3 inch. In one embodiment, the pencil brace 104*a* has a critical dimension of about 0.25 inch, and the pencil brace 104*b* has a critical dimension of about 0.375 inch. Each of the pencil braces 104*a*, 104*b* may be constructed as a single piece. Accordingly, each of the pencil braces 104*a*, 104*b* comprises a single unitary component that cannot be separated without destruction and may be constructed as a single plastic molded part.

Moreover, the cross-car beam structure 100 of FIGS. 3-11 eliminates deep cast cowls, which may have inefficient material layouts and are difficult to manufacture. Instead, the present disclosure describes a novel passenger-side pencil brace structure 104 that replace the cowl attachment component. As a result of this streamlined and more efficient design, the cross-car beam structure 100 is significantly lighter than the conventional cross-car beam structures (such as those shown in FIGS. 2 and 15-17), while also being stronger due to the pencil brace structure 104. For example, when the cross-car beam 100*a* is constructed out of magnesium and the pencil braces 104*a*, 104*b* are constructed out of steel, the cross-car beam structure 100 (as shown in FIG. 4) has a total weight in the range of 3.5 kg to 5.5 kg. More specifically, the cross-car beam structure 100 has a total weight in the range of 4.0 kg to 5.0 kg. Even more specifically, the cross-car beam structure 100 has a total weight in the range of 4.5 kg to 5.0 kg. Comparatively, for a similar sized vehicle, the conventional cross-car beam structure 10 (as shown in FIG. 2), which includes the cowl attachment component 21, weighs significantly more (e.g., 7-10 kg, or even 14-22 kg in some cases). The conventional cross-car beam structure 50 shown in FIG. 15, for a similar sized vehicle, would weigh approximately 6.5 kg.

Figure 12:
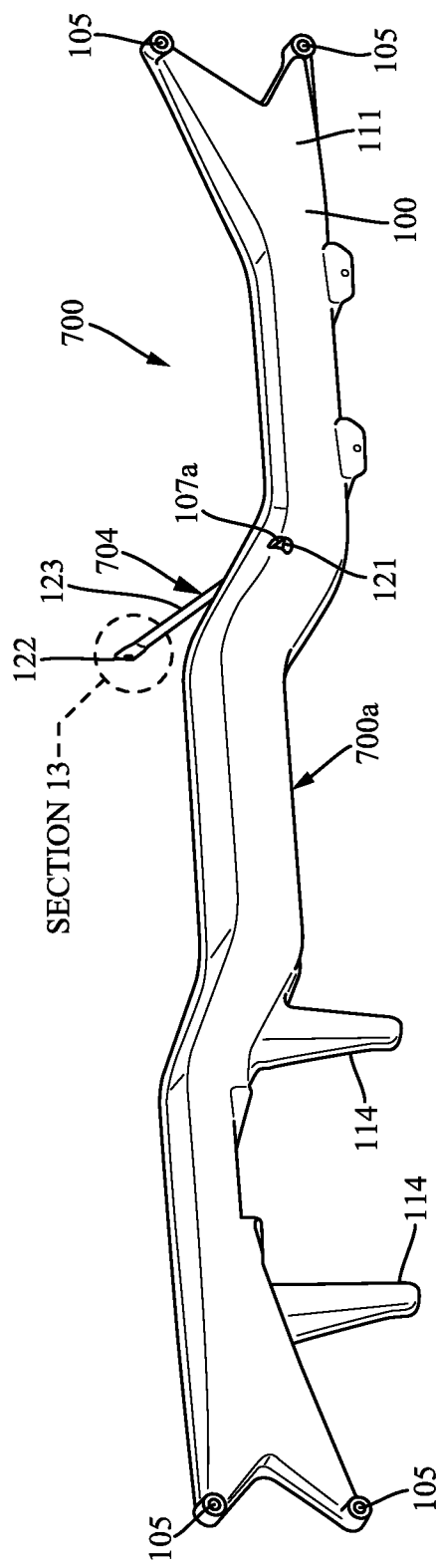
FIG. 12 is a schematic perspective front view of another exemplary embodiment of a cross-car beam structure.
Figure 13:
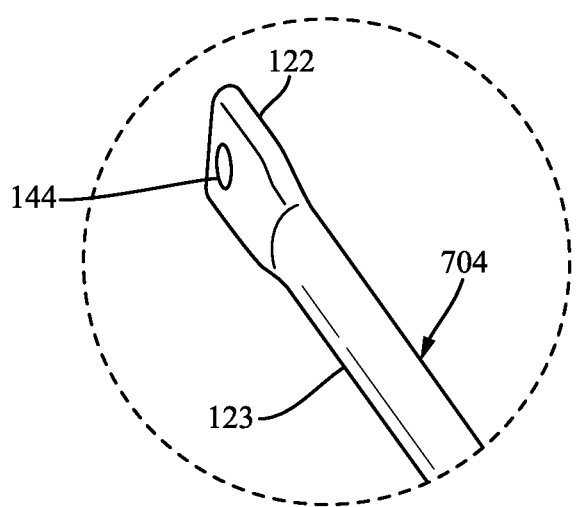
FIG. 13 is an enlarged view of Section 13 of FIG. 12.
Figure 14:
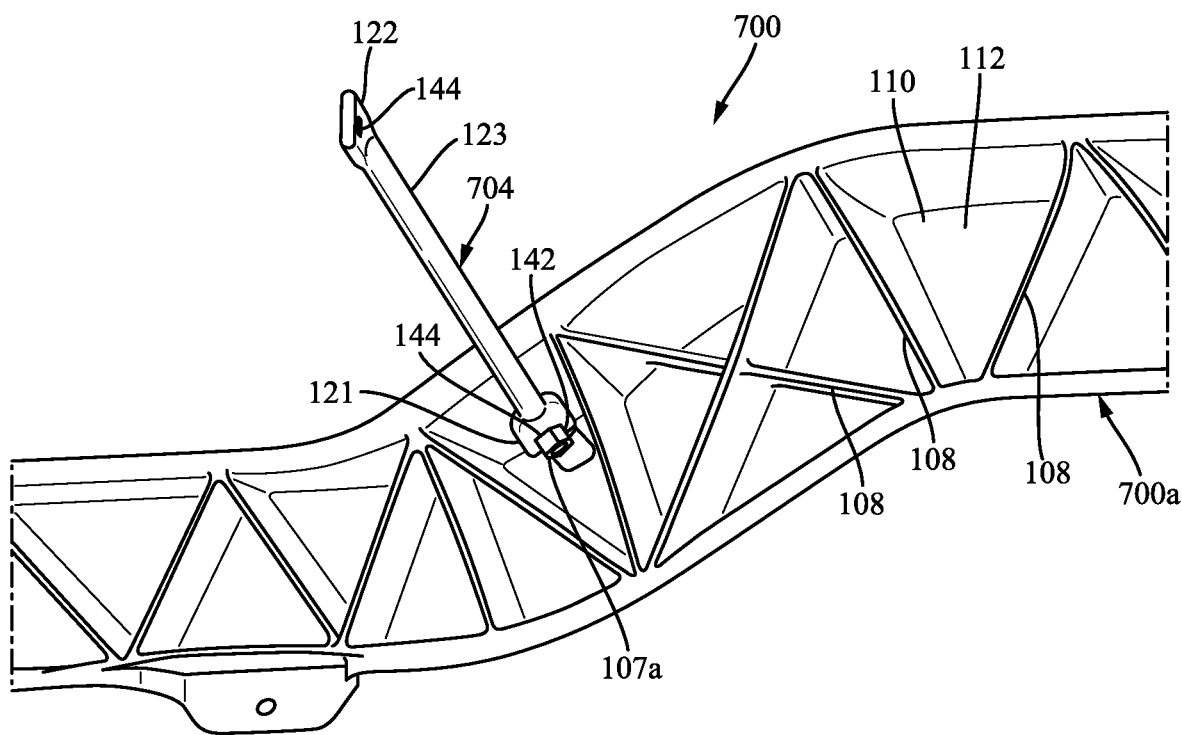
FIG. 14 is a schematic perspective rear view of a portion of the cross-car beam structure of FIG. 12.

FIGS. 12-14 illustrate another embodiment of a cross-car beam structure 700 that includes a cross-car beam 700a and only a single pencil brace 704. The cross-car beam structure 700, the cross-car beam 700a, and the pencil brace 704 may be configured the same as or similar to the cross-car beam structure 100, the cross-car beam 100a, and the pencil brace 104a (and the pencil brace structure 104), respectively, except where noted otherwise. For example, the cross-car beam 700a is functional without the attachment points 101 and 103 and the electrical grounding ports 102 of the cross-car beam 100a.

Similar to the cross-car beam structure 100 of FIGS. 3-11, the pencil brace 704 comprises the first end 121, the second end 122, and the body portion 123 as shown in FIGS. 12 and 14. Both the first end 121 and the second end 122 have a flat configuration (e.g., may be flattened or crimped (or formed initially with such a configuration)), and an aperture 144 may be drilled into (or formed in) the ends 121, 122 (see, for example, FIG. 13). Similar to the first pencil brace 104a, the first end 121 is configured to attach to the cross-car beam 700a, and the second end is configured to attach to either a second pencil brace or other automotive components, such as those shown in FIG. 3 (not shown in FIG. 12). The first end 121 and the second end 122 are each configured to receive a fastener 142 in order to attach to the cross-car beam 700a (via the attachment point 107a, as shown in FIG. 14) and a second pencil brace or other automotive component, respectively. In one embodiment, the fasteners 142 are weld nuts. Moreover, the pencil brace 704 may be constructed in a substantially similar manner and form as disclosed above for the pencil braces 104a and 104b with respect to shape, size, weight, and functionality. As is the case with the cross-car beam structure 100 of FIGS. 3-11, the cross-car beam structure 700 may be manufactured using at least one of die casting or molding and in either a single- or multiple-piece construction.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The construction and arrangement of the elements of the pencil brace as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. In some cases, the actions recited herein can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A cross-car beam structure for a vehicle comprising:
a cross-car beam comprising a first attachment point; and
a first pencil brace comprising a first end and a second end,
wherein the first end of the first pencil brace is configured to removably attach to the cross-car beam at the first attachment point;
wherein the second end of the first pencil brace is configured to attach to either a second pencil brace or to another automotive component within the vehicle; and
wherein the first pencil brace is attachable at different positions along a length of the first attachment point.

2. The cross-car beam structure of claim 1, wherein the first end of the first pencil brace has a flat configuration and defines an aperture for attaching to the cross-car beam at the first attachment point.

3. The cross-car beam structure of claim 1, wherein the second end of the first pencil brace has a flat configuration and defines an aperture for attaching to the second pencil brace or to the other automotive component within the vehicle.

4. The cross-car beam structure of claim 1, wherein the first pencil brace comprises a body portion that extends between the first end and the second end, and wherein the body portion has a substantially circular cross-section.

5. The cross-car beam structure of claim 1, wherein the first pencil brace extends in a substantially straight line between the first end and the second end.

6. The cross-car beam structure of claim 1, further comprising the second pencil brace comprising a first end and a second end, wherein the cross-car beam comprises a second attachment point, wherein the first end of the second pencil brace is configured to removably attach to the cross-car beam at the second attachment point.

7. The cross-car beam structure of claim 6, wherein the first end of the first pencil brace and the first end of the second pencil brace each have a flat configuration and define an aperture for attaching to the cross-car beam at the first attachment point and the second attachment point, respectively.

8. The cross-car beam structure of claim 6, wherein the second end of the first pencil brace and the second end of the second pencil brace each have a flat configuration and define an aperture for attaching to each other.

9. The cross-car beam structure of claim 6, wherein the cross-car beam comprises a main wall with a first side and a second side that are opposite each other, wherein the first pencil brace and the second pencil brace are configured to extend from the second side of the cross-car beam and attach to each other such that a triangle shape is formed from the first pencil brace, the second pencil brace, and a portion of the main wall.

10. A cross-car beam structure for a vehicle comprising:
a cross-car beam comprising a first attachment point and a second attachment point; and
a first pencil brace comprising a first end and a second end, wherein the first end of the first pencil brace is configured to removably attach to the cross-car beam at the first attachment point; and
a second pencil brace comprising a first end and a second end, wherein the first end of the second pencil brace is configured to removably attach to the cross-car beam at the second attachment point;
wherein the second end of the first pencil brace is configured to attach to either the second pencil brace or to another automotive component within the vehicle; and
wherein the first attachment point is positioned above the second attachment point.

11. The cross-car beam structure of claim 1, wherein the cross-car beam structure comprises only one pencil brace.

12. The cross-car beam structure of claim 1, wherein the first pencil brace is positioned along a passenger-side of the cross-car beam.

13. The cross-car beam structure of claim 1, wherein the first pencil brace is reattachable to the cross-car beam.

14. The cross-car beam structure of claim 1, wherein the cross-car beam and the first pencil brace are separately formed.

15. The cross-car beam structure of claim 1, wherein the first end and the second end of the first pencil brace are each configured to receive a fastener that is a weld nut to attach to the cross-car beam and to the second pencil brace or the other automotive component, respectively.

16. The cross-car beam structure of claim 1, further comprising a glove box rail configured to mount a glove box within the vehicle, wherein the glove box rail is removable from and reattachable to the cross-car beam.

17. The cross-car beam structure of claim 1, wherein the cross-car beam is configured to connect to an HVAC unit and a steering column of the vehicle and extend between vehicle door pillars of the vehicle.

18. The cross-car beam structure of claim 1, wherein the cross-car beam comprises a main wall with a first side and a second side that are opposite each other, wherein the cross-car beam comprises reinforcing planks extending from the second side of the main wall, wherein the first pencil brace is configured to extend from the second side of the main wall such that the second end of the first pencil brace is positioned along the second side of the main wall.

19. The cross-car beam structure of claim 1, wherein the cross-car beam comprises a material selected from the group consisting of aluminum, magnesium, and a plastic.

* * * * *